United States Patent
Harrison et al.

(10) Patent No.: US 7,673,995 B2
(45) Date of Patent: Mar. 9, 2010

(54) SYSTEM AND METHOD FOR PROJECTOR ALIGNMENT

(75) Inventors: Charles Frederick Harrison, Seattle, WA (US); Bran Ferren, Beverly Hills, CA (US); W. Daniel Hillis, Encino, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 948 days.

(21) Appl. No.: 10/885,459

(22) Filed: Jul. 6, 2004

(65) Prior Publication Data

US 2006/0007411 A1    Jan. 12, 2006

(51) Int. Cl.
G03B 21/14 (2006.01)

(52) U.S. Cl. .............................. 353/94; 353/121; 353/70

(58) Field of Classification Search .................... 353/94, 353/69, 70, 119, 122, 121; 348/745–747, 348/778, 794, 828–831, 840; 312/10.1, 242, 312/247, 248, 306, 307, 313, 317.1, 223.2, 312/223.3, 351.3–351.9

See application file for complete search history.

(56) References Cited

U.S. PATENT DOCUMENTS

| | | | | |
|---|---|---|---|---|
| 3,912,385 | A * | 10/1975 | Stokes et al. .................. 353/94 |
| 4,148,453 | A | 4/1979 | Brantly |
| 4,345,817 | A | 8/1982 | Gwynn |
| 4,974,073 | A | 11/1990 | Inova |
| 5,136,390 | A | 8/1992 | Inova et al. |
| 5,179,440 | A | 1/1993 | Loban et al. |
| 5,279,176 | A | 1/1994 | Tahmasebi et al. |
| 5,668,569 | A | 9/1997 | Greene et al. |
| 5,771,072 | A | 6/1998 | Tokoro et al. |
| 5,902,030 | A | 5/1999 | Blanchard |
| 5,956,000 | A | 9/1999 | Kreitman et al. |
| 6,017,123 | A | 1/2000 | Bleha et al. |
| 6,059,413 | A * | 5/2000 | Okubo ........................ 353/77 |
| 6,106,120 | A | 8/2000 | Menard |
| 6,115,022 | A | 9/2000 | Mayer, III et al. |
| 6,219,011 | B1 | 4/2001 | Aloni et al. |
| 6,219,099 | B1 | 4/2001 | Johnson et al. |
| 6,222,593 | B1 | 4/2001 | Higurashi et al. |
| 6,247,815 | B1 | 6/2001 | Inova |

(Continued)

OTHER PUBLICATIONS

Meaning of NOTCH, hyperdictionary, http://www.hyperdictionary.com/Search.aspx?define=notch, printed on Jun. 27, 2008.*

*Primary Examiner*—William C Dowling
(74) *Attorney, Agent, or Firm*—Tarolli, Sundheim, Covell & Tummino LLP

(57) ABSTRACT

A system for supporting a projector on a support structure relative to a projection surface includes a plurality of base members connectable with the support structure and having a position adjustable relative to the projection surface. The system also includes a base member calibration system for calibrating the base members to a predetermined position relative to the projection surface. The system also includes a plurality of foot members for supporting the projector. Each foot member has a position adjustable relative to the projector. The system further includes a projector calibration system for calibrating the projector to a predetermined position relative to the foot members. The projector calibrated to the predetermined position relative to the foot members is calibrated to the predetermined position relative to the projection surface when the foot members rest on the base members.

28 Claims, 8 Drawing Sheets

U.S. PATENT DOCUMENTS

| | | | |
|---|---|---|---|
| 6,254,239 B1 * | 7/2001 | Hibner et al. | 353/94 |
| 6,310,650 B1 | 10/2001 | Johnson et al. | |
| 6,340,976 B1 | 1/2002 | Oguchi et al. | |
| 6,377,306 B1 | 4/2002 | Johnson et al. | |
| 6,431,711 B1 | 8/2002 | Pinhanez | |
| 6,485,144 B1 * | 11/2002 | Liao | 352/243 |
| 6,491,401 B2 | 12/2002 | Tachibana | |
| 6,709,116 B1 * | 3/2004 | Raskar et al. | 353/121 |
| 6,814,449 B2 * | 11/2004 | Yamada et al. | 353/74 |
| 2002/0027608 A1 * | 3/2002 | Johnson et al. | 348/383 |
| 2004/0080665 A1 * | 4/2004 | Lovell | 348/373 |
| 2004/0223120 A1 * | 11/2004 | Tan | 353/30 |

* cited by examiner

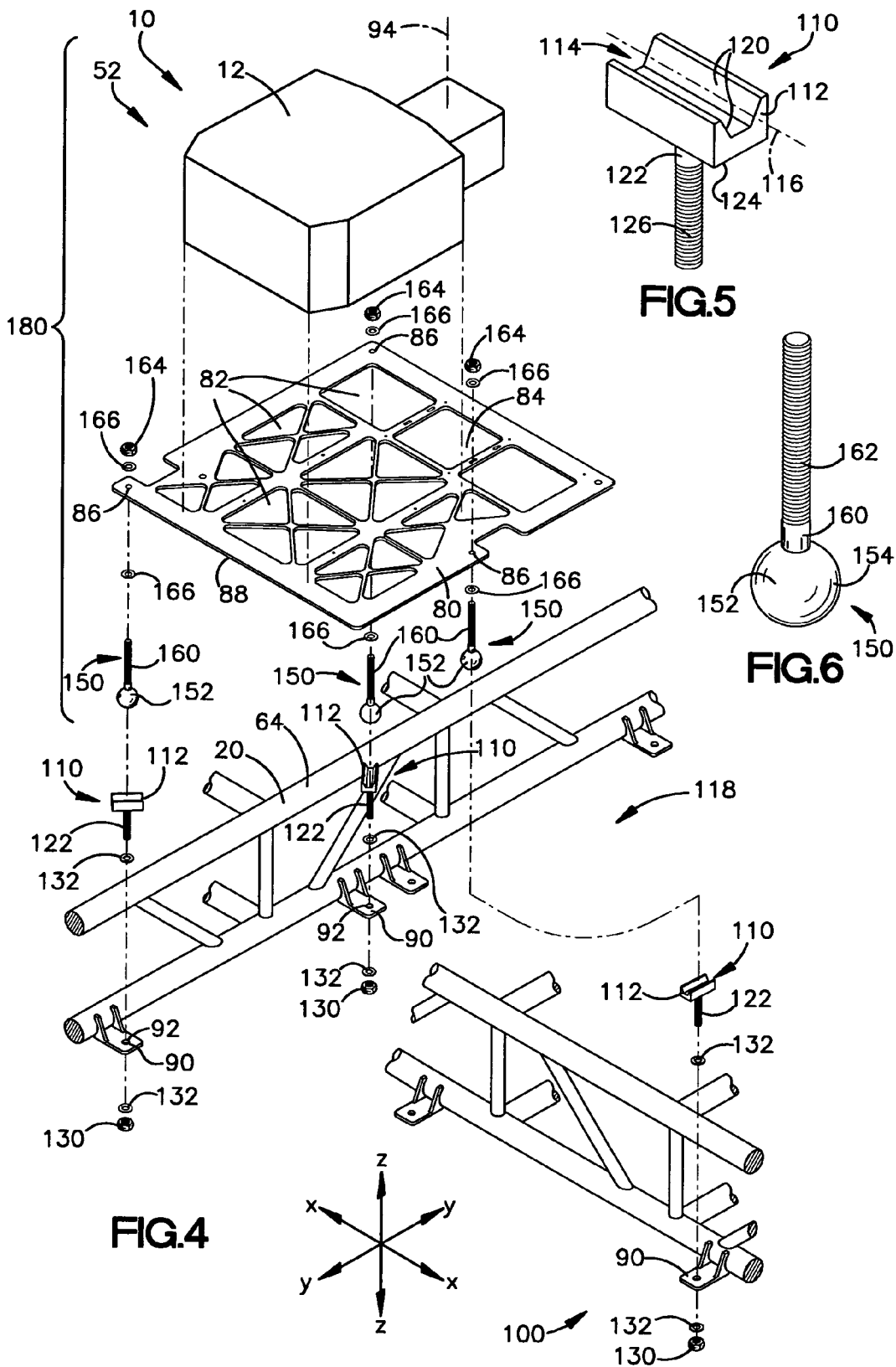

SYSTEM AND METHOD FOR PROJECTOR ALIGNMENT

TECHNICAL FIELD

The present invention relates generally to projectors and, more particularly, to a system and method for aligning projectors arranged in an array for producing a tiled composite image.

BACKGROUND OF THE INVENTION

Video projectors can be arranged in arrays of two or more projectors in order to project a tiled composite image in which each projector in the array projects a component image that forms a corresponding portion of the composite image. When projecting large images, video projector arrays can provide enhanced brightness and resolution of the composite image and can reduce the requisite distance between the projectors and the surface onto which the composite image is projected. When projecting a composite image via a projector array, it can be desirable to match or blend the adjacent edges of the component images in order to provide the appearance of a seamless composite image.

The component image produced by each projector in the projector array is formed as an array of pixels. The resolution of each image is affected by the pixel pitch (e.g., size or diameter) and the image size (e.g., the size of the pixel array that forms the image). The pixel pitch and image size help determine the pixel density (e.g., pixels per inch) of the image. For example, an image may have a pixel pitch of about 0.030 inch and may have an image size of 640×480, 800×600, or 1024×768 pixels. The pixel pitch and/or image size for a projector can, of course, vary.

In order to achieve the appearance of a single seamless composite image, it may be necessary to arrange or adjust the projectors in the array so as to eliminate gaps between the component images. It may also be necessary to align the projectors in the array such that the pixels that make up the periphery of the component images align correctly with the pixels of adjacent component images.

In the past, multiple-projector composite image projection systems have relied heavily on "in-situ" alignment procedures in which projectors are arranged in an array and subsequently adjusted to align the projectors relative to one another. In-situ alignment of projectors relative to one another can, however, produce cumulative errors that are increasingly and exponentially difficult to control as the size of the projector array increases. In-situ alignment of projectors can also result in downtime for the projector array when a projector is replaced, such as during repairs, and alignment of the replacement projector is required.

SUMMARY OF THE INVENTION

According to one aspect of the present invention, a system for supporting a projector on a support structure relative to a projection surface comprises a plurality of base members connectable with the support structure and having a position adjustable relative to the projection surface. The system also includes a base member calibration system for calibrating the base members to a predetermined position relative to the projection surface. The system also includes a plurality of foot members for supporting the projector. The position of the projector is adjustable relative to the foot members. The system further includes a projector calibration system for calibrating the projector to a predetermined position relative to the foot members. The projector calibrated to the predetermined position relative to the foot members is adapted to rest on the base members calibrated to the predetermined position relative to the projection surface.

According to another aspect of the invention, a system projects a tiled composite image on a projection surface from a support structure positioned relative to the projection surface. The composite image is composed of an array of component images. The system comprises a plurality of projector positions arranged on the support structure. Each projector position is associated with a component image area on the projection surface and includes adjustable base members adjusted to predetermined positions relative to the projection surface. The system also includes a plurality of projector assemblies each comprising foot members and a projector adjusted to predetermined positions relative to the foot members. The foot members of any of the plurality of projector assemblies are receivable in the base members of any of the plurality of projector positions to thereby support the associated projector at a predetermined position relative to the component image area of the projector position.

According to another aspect of the invention, a system for supporting a projector on a support structure relative to a projection surface includes projector support means for supporting the projector. The projector support means has a position adjustable relative to the projector. The system also includes means for calibrating the projector to a predetermined position relative to the projector support means. The system also includes receiving means for receiving the projector support means. The receiving means is connectable with the support structure and has a position adjustable relative to the projection surface. The system further includes means for calibrating the receiving means to a predetermined position relative to the projection surface. The receiving means calibrated to the predetermined position relative to the projection surface are adapted to receive the projector support means calibrated to the predetermined position relative to the projector, thus positioning the projector at a predetermined position relative to the projection surface.

BRIEF DESCRIPTION OF THE DRAWINGS

FIG. 4 illustrates an exploded view a portion of the system of FIG. 1.

FIGS. 5 and 6 illustrate portions of the system of FIG. 4.

DETAILED DESCRIPTION OF INVENTION

Figure 1:
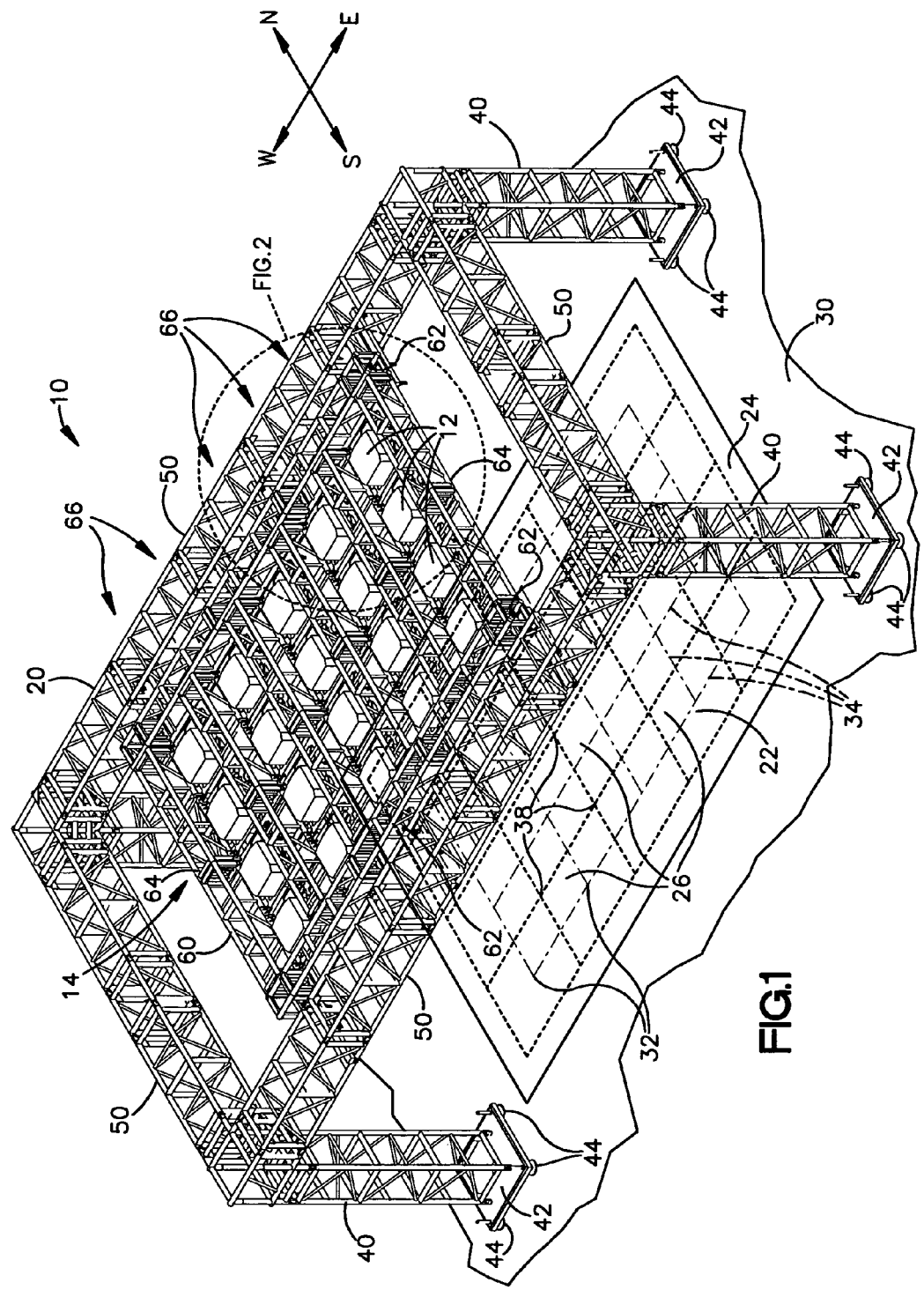
FIG. 1 illustrates a system including a projector array for producing a composite image according to an embodiment of the present invention.

The present invention relates to a system and method for providing projector assemblies that can be interchangeably arranged in an array on a support structure, such as a truss system. The projector array projects a composite image on a projection surface that is positioned a given distance from the support structure. The composite image is composed of an array of adjacent component images, each of which is projected on the projection surface by a corresponding one of the projector assemblies in the projector array. The accuracy required at the projection surface can be about half a pixel or less. Considering that the projector assemblies in the projector array may be positioned a relatively long distance from the projection surface, higher accuracy may be required at the projector location than is required at the projection surface. Prior to installation, the projector assemblies and support structure are calibrated to a predetermined mechanical/optical configuration with a high degree of precision. This facilitates achieving the high accuracy required for aligning the component images while also facilitating interchangeability of the projector assemblies on the support structure.

The system includes a projector support plate upon which the projector is mounted and three kinematic mounts for supporting the support plate, and thus the projector, at a projector position on the support structure. Each kinematic mount includes a base member connectable with the support structure and a corresponding foot member connectable with the projector support plate. The projector assembly, which includes the assemblage of the projector, projector support plate, and foot members, is positioned such that each foot member rests on a corresponding base member. The base members and foot members are arranged such that there is but a single position at which the projector assembly will rest with all three foot members positioned engaging their corresponding base members.

The projector, e.g., optical element or projector lens of the projector, of each projector assembly is calibrated to the same position relative to the foot members of the projector assembly with a high degree of precision. The position of the projector relative to the foot members is achieved through a calibration procedure performed with the projector assembly mounted on a projector alignment fixture.

Also, the base members at each projector position on the support structure are calibrated, with a high degree of precision, to the same position relative to the area on the projection surface upon which the component image of the projector associated with the projector position will be projected. The base members are so calibrated by mounting an alignment plate on the base members and performing a calibration procedure in which the base members are adjusted so as to place the alignment plate at a desired position relative to the projection surface.

Since the optical system of each projector assembly is calibrated to the same position relative to the projector assembly foot members; and the base members at each projector position are calibrated to the same position relative to their associated component image area on the projection surface, any calibrated projector assembly when placed at any calibrated projector position will project an aligned component image without requiring adjustments.

The present invention relates to a system 10 for supporting projectors 12 in a projector array 14 on a support structure 20, such as a truss system. The projector array 14 projects a composite image 22 on a projection surface 24 that is positioned a given distance from the support structure 20. The composite image 22 is composed of an array of adjacent component images 26, each of which is projected on the projection surface 24 by a corresponding one of the projectors 12 in the projector array 14. In the embodiment illustrated in FIGS. 1 and 2, the support structure 20 is a truss system that supports the projector array 14 above the projection surface 24 on a horizontal surface 30 upon which the support structure rests, such as a floor. The system 10 could, however, be adapted to project the composite image 22 on an alternative projection surface (not shown), such as a screen having a non-horizontal orientation (e.g., vertical or perpendicular to the floor). Also, the system 10 could be adapted such that the projector array 14 is supported on a support structure other than the truss system illustrated in FIGS. 1 and 2, such as a frame or other structure suspended from a ceiling.

The system 10 shown in FIGS. 1 and 2 will be described herein with reference to the surface 30 being oriented horizontally relative to the earth, e.g., perpendicular to plumb. For convenience in description, the support structure 20 is aligned such that certain portions align with cardinal directions North (N), South (S), East (E), and West (W), as shown in FIG. 1.

Figure 2:
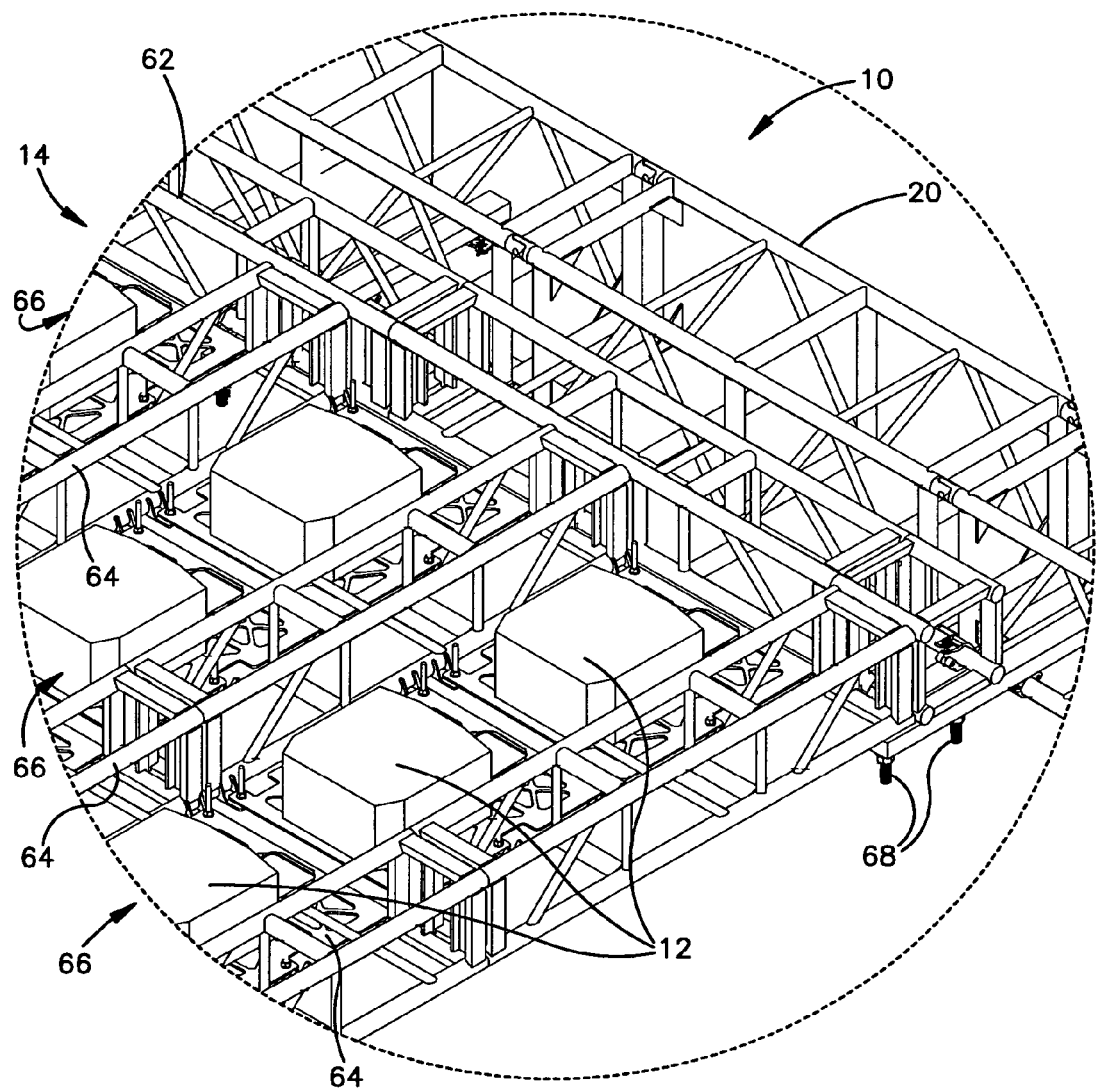
FIG. 2 illustrates a portion of the system of FIG. 1.

In the embodiment of FIG. 1, the support structure 20 includes four columns 40 supported on foot plates 42 resting on the horizontal surface 30. The foot plates 42 may include means 44, such as threaded feet, for adjusting the elevation of the columns 40 relative to the surface 30 and for truing the columns to plumb. The support structure 20 includes four horizontal cross-members 50, each of which are supported by and extend between respective pairs of the columns 40. Two of the cross members 50 extend in an East-West direction, along a width dimension of the composite image 22. The remaining two of the cross members 50 extend in an North-South direction, along a height dimension of the composite image 22.

The support structure 20 also includes a projector array support structure 60 supported from the East-West cross members 50. The projector array support structure 60 includes a pair of cross members 62 that extend parallel to the East-West cross members 50. The projector array support structure 60 also includes a plurality of projector support members 64 that extend between and perpendicular to the cross members 62. The position of the projector array support structure 60 relative to the cross members 50 and relative to the projection surface 24 may be adjusted, for example, by adjusting threaded connections between the projector array support structure 60 and the support structure 20 at locations such as those identified at 68 in FIG. 2.

The number of projector support members 64 may depend, at least in part, on the number of projectors 12 in the projector array 14. In the embodiment illustrated in FIG. 1, the projector array 14 is a twenty projector array arranged in a 4×5 configuration. The 4×5 projector array 14 is arranged such that the projectors 12 are arranged in five columns 66 including four projectors each. The columns 66 extend parallel to each other in a North-South direction and are positioned between respective pairs of the projector support members 64. Thus, in the embodiment illustrated in FIG. 1, the five column projector array 14 dictates that the projector array support structure 60 includes six projector support members 64.

Figure 3:
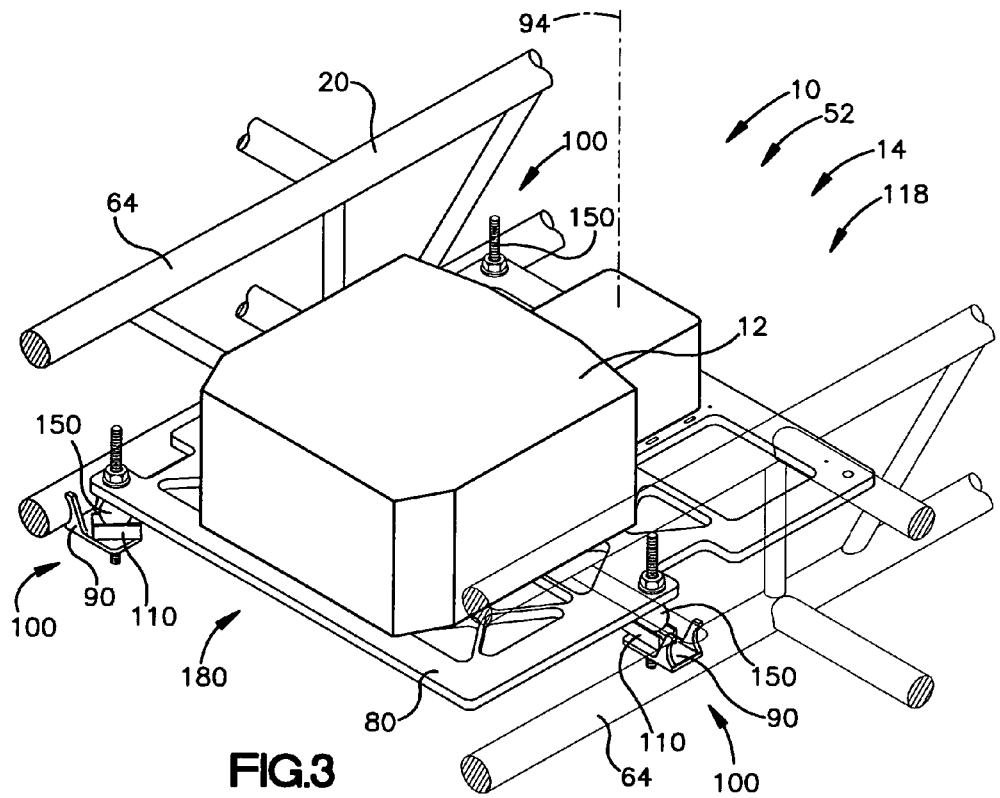
FIG. 3 illustrates a portion of the system of FIG. 2.

FIGS. 3 and 4 illustrate a single projector position 52 in the projector array 14. The position 52 of FIGS. 3 and 4 is illustrative of a number of different positions in the array 14. Referring to FIGS. 1-4, the system 10 also includes projector support plates 80 upon which each projector 12 in the projector array 14 is mounted. The support plates 80 are constructed with a high degree of precision and low dimensional tolerances from a high strength rigid material, such as an aluminum plate material. The support plates 80 could, however, be constructed of alternative materials. As best shown in FIG. 4, each support plate 80 has a generally rectangular configuration with a plurality of cutout portions 82 arranged within a periphery of the support plate. The cutout portions 82 may facilitate a reduction of the weight of the support plate 80 without compromising the structural integrity of the support plate. One of the cutout portions 82 forms a projector opening 84 through which a projector 12 mounted on the support plate 80 may project its image.

The support plates 80 (FIGS. 3 and 4) may be constructed to mate with the projectors 12 such that a projector, when supported on the support plate, has a substantially precise location relative to the support plate. This substantially precise location positions the projector 12 to project its image along an optical axis 94 in a desired direction. The projectors 12 may be secured to their respective support plates 80 by means, such as fasteners. The support plates 80, and thus the projectors 12, are connected to the projector support members 64, and thus to the support structure 20, by kinematic mounts 100.

Referring to FIGS. 3 and 4, each support plate 80 is associated with three kinematic mounts 100 for supporting the support plate and its associated projector 12 on the support structure 20. Each kinematic mount 100 includes a base member 110 and a foot member 150. The three base members 110 associated with a projector position 52 define, in aggregate, a receiving location 118 for the projector assembly 180. In the illustrated embodiment, the base member 110 of each kinematic mount 100 is connectable with the support structure 20 and the foot member 150 of each mount is connectable with the support plate 80. It will be appreciated that this arrangement could, however, be reversed, e.g., the base members 110 being connectable with the support plate 80 and the foot members 150 being connectable with the support structure 20, in which case, the foot members would define the receiving location.

An example of a base member 110 is illustrated in FIG. 5. Referring to FIG. 5, the base member 110 is constructed of a high strength rigid material, such as a hardened steel, and includes a body portion 112 having an elongated notch 114 formed therein. The notch 114 extends along a longitudinal axis 116 of the body portion 112. The notch 114 includes opposing side walls 120 that extend parallel to the longitudinal axis 116 and at acute angles relative to each other. The notch 114 thus, for example, may have a V-shaped or a partial or truncated V-shaped cross-section. The notch 114 is arranged facing concavely upward as viewed in the Figures with the widest spacing of the side walls 120 positioned upward of lower, converging portions of the side walls.

The base member 110 also includes a shank portion 122 that extends from a lower surface 124 of the body portion 112 opposite the notch 114. The shank 122 has a threaded portion 126 for mating with a fastener 130 (FIG. 4), such as a nut, to secure the base member 110 to the support structure 20. As shown in FIGS. 3 and 4, the support structure 20 may include tabs 90 that are secured to the projector support members 64 by means, such as welding or fasteners. The tabs 90 include apertures 92 through which the shank portion 122 of the base member 110 may extend to allow the base member to be connected with the support structure 20 via the fastener 130.

Referring to FIGS. 3 and 4, the connection between the tabs 90 and the base members 110 allows for adjusting the position of the base members relative to the support structure 20 and thus relative to the projection surface 24 (see FIG. 1). The base members 110 and tabs 90 are constructed to allow for six degrees of freedom of movement in adjusting the position of the receiving location 118 relative to the support structure 20 and projection surface 24. These six degrees of freedom are best described with reference to the x, y, and z axes illustrated in FIGS. 3 and 4. The six degrees of freedom are movement along the x, y, and z axes, rotation about the x-axis (pitch), rotation about the y-axis (roll), and rotation about the z-axis (yaw).

The diameter of the apertures 92 in the tabs 90 is sized so as to allow for a clearance between the respective shanks 122 of the base members 110 that extend through the apertures. This allows for adjusting the position of the receiving location 118 along the x-axis and y-axis. This also allows for adjusting the rotational position of the receiving location 118 about the z-axis. The position of the receiving location 118 along the z-axis can be adjusted by shimming the connections between all three of the base members 110 and their respective tabs 90 equally using means 132, such as washers. Pitch and roll of the receiving location 118 can be adjusted by shimming one or more of the connections between base members 110 and the tabs 90.

The positions of the base members 110 for each position 52 in the projector array 14 are calibrated so that their notches 114 have an upward facing generally co-planar configuration with their respective longitudinal axes 116 directed toward a common center point. The position of the base members 110 for each position 52 in the projector array 14 is also calibrated to have a highly precise position and orientation relative to the area of its corresponding component images 26 (e.g., the center and corners of the component images). The foot members 150 of each projector assembly 180 are calibrated to have a highly precise position relative to their corresponding projector 12, e.g., projector lens.

An example of a foot member 150 is illustrated in FIG. 6. Referring to FIG. 6, the foot member 150 is constructed of a high strength rigid material, such as a hardened steel, and includes a head portion 152 having a spherical surface 154 formed thereon. The foot member 150 also includes a shank portion 160 that extends from the head portion 152 and has a threaded portion 162 to secure the foot member 110 to the support plate 80. As shown in FIGS. 3 and 4, the support plate 80 may include threaded apertures 86 through which the threaded portion 162 of the foot member 150 may extend to allow the foot member to be connected with the support plate 80 and to be locked against movement via a fastener 164, such as a lock nut. The foot member 150, when connected with the support plate 80 is positioned such that the head portion 152 projects a predetermined distance from a lower surface 88 of the support plate.

Referring to FIGS. 3 and 4, the connection between the support plate 80 and the foot members 150 allows for adjusting the position of the support plate, and thus the projector 12 supported on the support plate, relative to the foot members. The apertures 86 in the support plate 80 are threaded to receive the threaded shanks 160 of the foot members 150. The position of the projector 12 relative to the foot members 150 along the z-axis can be adjusted by screwing the foot members 150 to a desired position relative to the support plate 80. This also allows for adjusting the rotational position of the projectors 12 relative to the foot members 150 about the x-axis and y-axis. The fasteners 164 can then be installed to lock the projector 12 a desired position relative to the foot members 150.

The projector 12 supported on the support plate 80 with the foot members 150 secured to the support plate forms a projector assembly 180 that may be supported from the support structure 20. When the projector assembly 180 is supported on the support structure 20, the foot members 150 of the assembly rest on corresponding base members 110 that are secured to the projector support members 64.

When the foot members 150 of a projector assembly 180 are placed on the base members 110 of a position 52 in the projector array 14, the spherical surfaces 154 of the head portions 152 engage the side walls 120 of the notches 114 at a single point or location on each side wall. The kinematics of the spherical surfaces 154 engaging the side walls 120 of the notches 114 dictates that there is a single finite position of the projector assembly 180 in which all three foot members 150 will rest in engagement with the side walls of their corresponding base members 110. Thus, the foot members 150 for each projector assembly 180 in the projector array 14 are positioned relative to the projector 12 of the assembly with high precision. The base members 110 for each projector position 52 in the projector array 14 are positioned relative to the portion of the projection surface 24 where their respective component images 26 are projected with high precision. The projector assemblies 180 are thus calibrated to a standard configuration and are therefore interchangeable at any position 52 in the projector array 14. The projector assembly 180 at any position 52 may be swapped with each other or replaced with another calibrated projector assembly. The projector assemblies 180 and projector array positions 52 are thus calibrated to produce a seamless composite image 22 without adjustments or re-calibration.

The degree of precision required in calibrating the projector assemblies 180 can vary depending on factors such as the type of composite image 22 being projected and the optical distance between the projector lens and the projection surface 24. For example, adjacent component images 26 may have to be aligned to within as little as about 0.015 inches or less in order to provide a seamless appearance of the composite image 22. For each position 52 in the projector array 14, providing the required degree of precision requires calibrating the position of the base members 110 relative to the projection surface 24 with high precision. For each projector assembly 180, providing the required degree of precision requires calibrating the position of the projector optical system relative to the foot members 150 with high precision. The present invention provides a system and method for achieving this high precision.

The support structure 20 (FIG. 1) is be installed true, level, and at the correct height using known construction equipment and techniques. This helps ensure that only small amounts of vertical adjustment of the base members 110 at the individual projector positions 52 in the projector array 14 are required. The support structure 20 should be set such that the projector array support structure 60 is slightly below nominal height. This ensures that any vertical adjustments to the base members 110 that may be required involve shimming the base members up (e.g., vertically along the Z-axis). Also, because the support structure 20 may deflect slightly under load, projectors 12 or equivalent dummy weights should be placed at the other positions 52 in the projector array 14 while adjustments are being made at any given position in the array.

The alignment of the base members 110 is separated or de-coupled from the alignment of the foot members 150. This de-coupling may be desirable for purposes of interchangeability of the projector assemblies 180. Separate alignment procedures facilitate avoiding any links between the alignment of the base members 110 and foot members 150, which facilitates interchangeability of the projector assemblies 180. To facilitate the alignment of the base members 110, measurements may be taken with reference to horizontal (level) and vertical (plumb) to the Earth.

Figure 7:
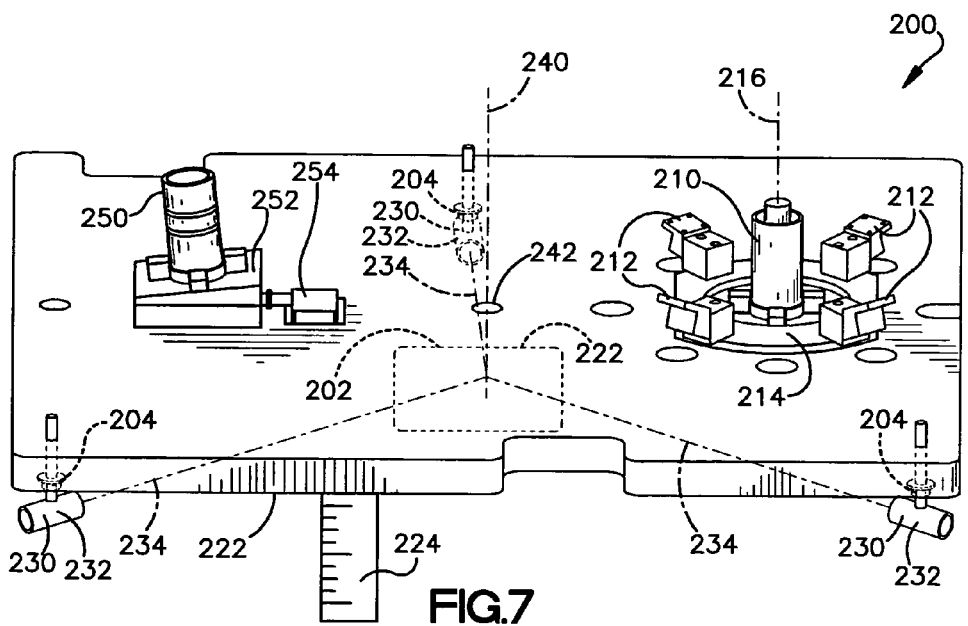
FIG. 7 illustrates an alignment plate used to align a portion of the system of FIG. 1.

Referring to FIG. 7, the system 10 may also include an alignment plate 200 for facilitating the adjustment of the alignment of the base members 110 relative to the projection surface 24 for each position 52 in the projector array 14. The alignment plate 200 includes a plate 202 that has a footprint that is similar or identical to that of the support plates 80. For convenience, the alignment plate 200 may be constructed to have the same weight as the one of the projector assemblies 180 so as to mimic any deflection in the support structure 20 created by the load of the projector assemblies. The alignment plate 200 includes apertures 204 for receiving and connecting with foot members, which are discussed below.

The alignment plate 200 is equipped with a center laser 210 that is positioned to project a beam along an axis 216 that coincides with the optical axis 94 of the projector 12 of the projector assembly 180 (see FIGS. 3 and 4). The alignment plate 200 is also equipped with four corner lasers 212 that project respective beams that are used to identify the four corners 38 of the component image 26 for the position in the projector array 24 at which the alignment plate 200 is installed. The corner lasers 212 are seated on an annular boss 214 that is centered on the axis 216 and can rotate relative to the alignment plate 200 about the axis 216. The corner lasers 212 are precision adjusted relative to the center laser 210 such that the beams of the corner lasers converge, cross each other, and hit the corners of the component image 26 when the alignment plate is at a substantially precise position relative to the projection surface 24. The boss 214 can be rotated to direct the beams of the corner lasers 212 to various angular positions. For example, the beams of the corner lasers 212 can be overlaid on each others' positions, rotated 180 degrees, or positioned diagonally across either centerline of the component image 26. The ability to overlay the beam positions may facilitate calibration of the alignment plate.

The alignment plate 200 is also equipped with a guidance laser 250 that is spaced horizontally from the center laser 210 and projects a beam that is coplanar with the beam of the center laser. The guidance laser 250 includes means 252 for setting the angular position of the guidance laser relative to the alignment plate 200 and means 254 for adjusting the position of the guidance laser. The alignment plate 200 is also equipped with high precision surface mirror 220 that is secured to a lower surface 222 of the alignment plate and extends perpendicular to the beam of the center laser 210. The alignment plate 200 is further equipped with a ruler scale 224 that is mounted to extend perpendicularly from the lower surface 222.

There are two different foot members that may be fitted in the apertures 204 of the alignment plate 200. The alignment plate 200 may be equipped with the foot members 150 described above in regard to the kinematic mounts, e.g., those having a spherical surface 154 on the head portion 152. The alignment plate may also be equipped with foot members 230, as shown in FIG. 7. The foot members 230 are similar to the foot members 150, except that the foot members of FIG. 7 have a head portion 232 with a cylindrical configuration. The diameter of the cylindrical head portion 232 is the same as the diameter of the spherical surface 154 of the head portion 152 of the foot members 150.

The foot members 230 are mounted to the alignment plate such that the respective axes 234 of the cylindrical head portions 232 point toward a common center of the alignment plate. This center lies on an axis 240 of a center hole 242 bored through the alignment plate 202. When the alignment plate 220, with the foot members 230 attached thereto, is placed on the base members 110 of a position in the projector array 14, the foot members 230, being in a fixed position pointed toward the common center 240, direct the base members to align their respective axes 116 toward the same common center.

With the base members 110 aligned toward the common center 240, the relative thickness of the washers 132 of each of the three individual mounts of the projector location can be adjusted to control rotation around the x-axis (pitch) and rotation around the y-axis (roll) of the plane of the base members. The thickness of the washers 132 of all three base members 110 of the position 52 in the projector array 14 can be adjusted identical amounts to facilitate the control of the position of the plane of the base members 110 along the z-axis. The clearance between the apertures 92 in the tabs 90 and their respective shanks 122 of the base members 110 allows the position of the plane of the base members to be adjusted horizontally along the x-axis and y-axis and also to adjust rotation about the z-axis (yaw).

Figure 8:
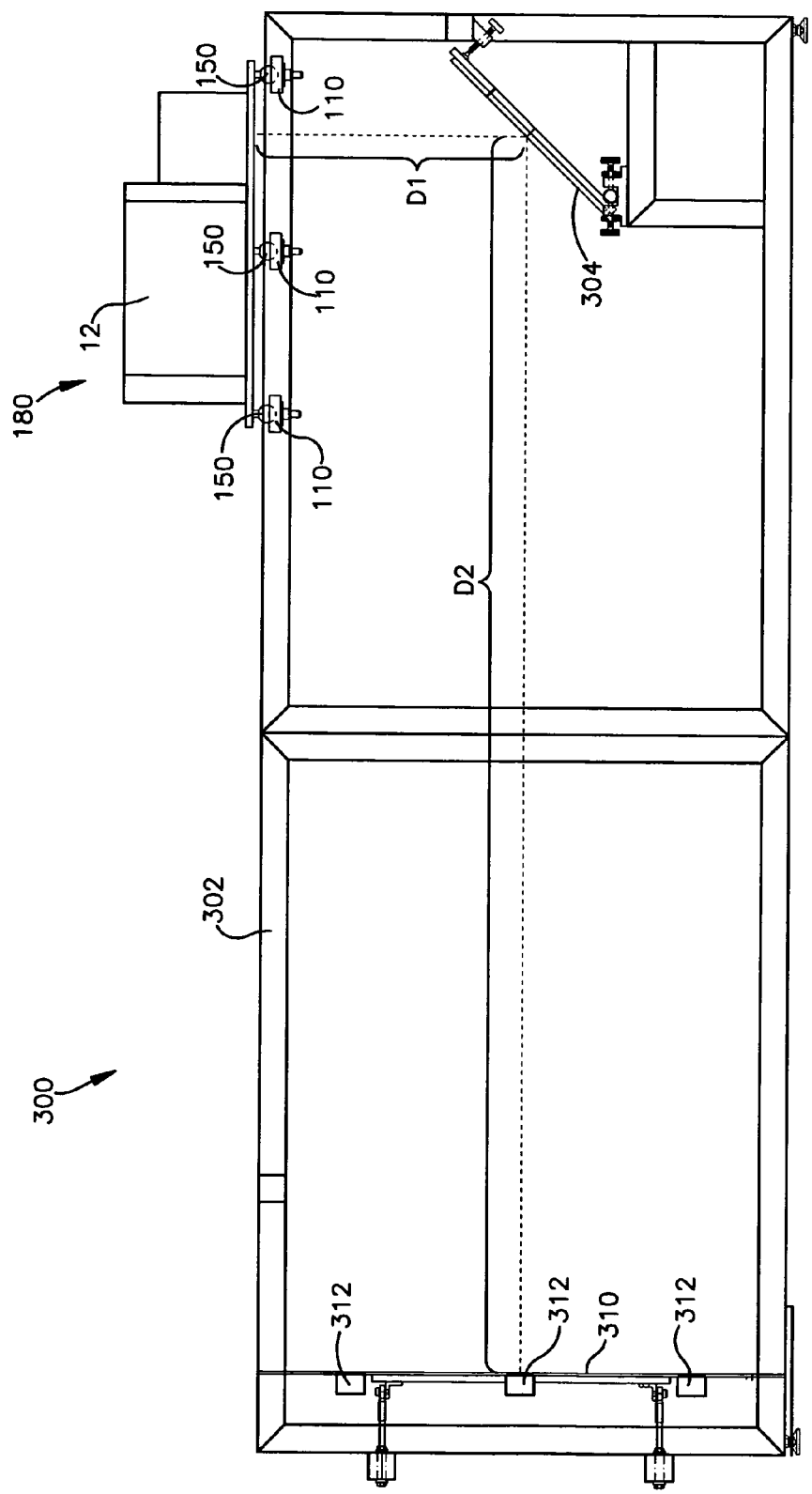
FIG. 8 illustrates an alignment fixture used to align a portion of the system of FIG. 1.

Referring to FIG. 8, the system 10 may also include an alignment fixture 300 for facilitating adjustment of the alignment of the projector 12 relative to the foot members 150 for each projector assembly 180. The alignment fixture 300 includes a rigid frame 302 upon which three base members 110 are mounted in a configuration intended to match the configuration of the base members at any one of the positions 52 in the projector array 14. The base members 110 are mounted vertically above a precision surface mirror 304 positioned at an angle (e.g., 45 degrees) with the plane of the base members. The alignment fixture 300 also includes a projection screen 310 mounted perpendicular to the plane of the base members 110 at an end of the fixture opposite the mirror 304. The position of the mirror 304 and the screen 310 are each independently adjustable to allow for maintaining perpendicular orientation of the screen and base members 110 and the angles between the mirror 304 and the screen/base members.

The alignment fixture 300 is dimensioned such that the projection distance, e.g., the sum of distances D1 and D2 in FIG. 8, is equal to the projection distance in the system 10 (e.g., from the projector 12 to the projection surface 24). For example, this projection distance may be ten feet. The screen 310 is sized to be at least as large as a component image 26 of the composite image 22. For example, this screen 310 may be 30×40 inches. The screen 310 may be fitted with imaging devices, such as charge coupled device (CCD) cameras 312, positioned at each corner and at the center of the image area on the screen. The CCD cameras 312 can be centered on their respective corners/center of the image area on the screen 310. When a projector assembly 180 is placed on the base members 110 of the alignment fixture 300, the projector 12 projects an image onto the mirror 304, which reflects the image onto the screen 310. The CCD cameras 312 receive portions of the image projected onto on the screen 310.

The positions of the base members 110 for each position 52 in the projector array 14 are calibrated through use of the alignment plate 200 (FIG. 7) described above. In addition, means for establishing plumb, such as an optical or laser plumb bob (not shown), may be required. Also, means for measuring or establishing reference lines or points in space, such as a construction transit (not shown), may also be required.

The alignment plate 200 is initially calibrated using mechanical and optical techniques known in the art. The position of each of the cylindrically formed foot members 230 is adjusted such that the foot members are directed to the common center 240 centered on aperture 242. Alignment means, for example dowel pins, are installed so that the foot members 230 may be removed and re-installed achieving substantially identical positions. The emitting component of center laser 210 is shimmed or otherwise adjusted relative to the housing component to direct the beam of the center laser 210 perpendicular to the reference plane established by the bottom surface 222 of plate 200. The perpendicularity may determined, for example, by directing the laser beam at a distant target screen and rotating the center laser against its seat in plate 200, noting any deviation of the beam position at the target. The corner lasers 212 are shimmed or otherwise adjusted to direct the beams of the corner lasers 212 to the respective corners of the component image area on a target screen located a determinate distance from the reference surface 222. The target screen may bear reference marks applied at substantially exact corner locations. During the calibration of alignment plate 200, the target screen should be substantially perpendicular to, and centralized on, optical axis 216. It will be appreciated that perpendicularity and centralization of the target may be verified by rotating the lasers 212 via the boss 214 and monitoring whether the laser beams strike the corners of the image area at identical points when rotated, for example, 180 degrees. During calibration of alignment plate 200, the pattern of corner reference marks on the target screen should also be angularly aligned with the alignment plate 200, which may be achieved using a spirit level or other methods known in the art. The emitting component of guide laser 250 is shimmed or otherwise adjusted relative to the housing component to direct the beam of laser 250 substantially perpendicular to the upper surface of wedge plate 252. The perpendicularity may be determined in the manner described for laser 210. Observing the location where laser beams strike the target screen, the position of guide laser 250 is adjusted, using means 254, so that the guide laser beam overlays a beam from a laser 212, when lasers 212 have been rotated into an appropriate position via boss 214. It will be appreciated that the condition of overlayed beams arriving at different angles corresponds to a specific distance between the alignment plate 200 and the target screen on which the beams overlay.

The alignment fixture 300 is initially adjusted such that the base members 110 lie on a plane. The calibrated alignment plate 200 is placed on the base members 110, and the base members are adjusted for full engagement with the cylindrically formed foot members 230 of the alignment plate. It will be appreciated that this results in the respective axes of the base members 110 being directed toward a common center. The mirror 304 is adjusted to extend at a 45 degree angle with the plane of the foot members 110. The screen 310 is adjusted to extend at a 45 degree angle with the plane of mirror 304. The correct angular settings may be confirmed, for example, by observing that an auxiliary mirror placed at the center of screen 310 reflects the beam of laser 210 directly back to its origin. Adjustments are made to ensure that D1 and D2 add up to the projection distance between the projector assemblies 180 and projection surface 24. The CCD cameras 312 are arranged to cover the location of the corners and center of the desired component image area of the screen 310. It will be appreciated that the correct adjustment of the alignment fixture 300 regarding angular orientation and positioning perpendicular to the optical axis may be verified by observing that the beams emitted by lasers 210 and 212 strike the centers of the respective CCD cameras, and that this condition is maintained when lasers 212 are rotated via boss 214. It will further be appreciated that the correct adjustment of the alignment fixture regarding distance along the optical axis may be verified by observing the overlay of beams from lasers 250 and 212.

According to one aspect of the invention, the alignment plate 200 is calibrated to direct the laser beams to the corners and center of a reference component image area. The alignment plate 200 is used to calibrate the base members 110 of each position 52 on the support structure such that the alignment plate directs the laser beams to the corners and center of the component image areas 26 on the projection surface 24. The foot members 150 of the projector assemblies 180 are calibrated using the alignment fixture 300 to project a reference image (e.g., rectangle) to overlie the respective corners and center of the reference component image area on the screen 312. The optical configuration of the calibrated alignment plate 200 is thus substantially "matched" to that of each calibrated projector assembly 180. Thus, any calibrated projector assembly 180, placed in any calibrated projector position 52 in the projector array 14, can project an aligned component image 26 onto the projection surface 24 without any further calibration or adjustment.

FIGS. 9-13 illustrate example methodologies for implementing the system 10 in accordance with aspects of the present invention. While, for purposes of simplicity of explanation, the methodologies of FIGS. 9-13 are shown and described as being implemented serially, it is to be understood and appreciated that the present invention is not limited to the illustrated order, as some aspects could, in accordance with the present invention, occur in different orders and/or concurrently with other aspects from that shown and described. Moreover, not all illustrated features may be required to implement the methodologies in accordance with an aspect of the present invention.

Figure 9:
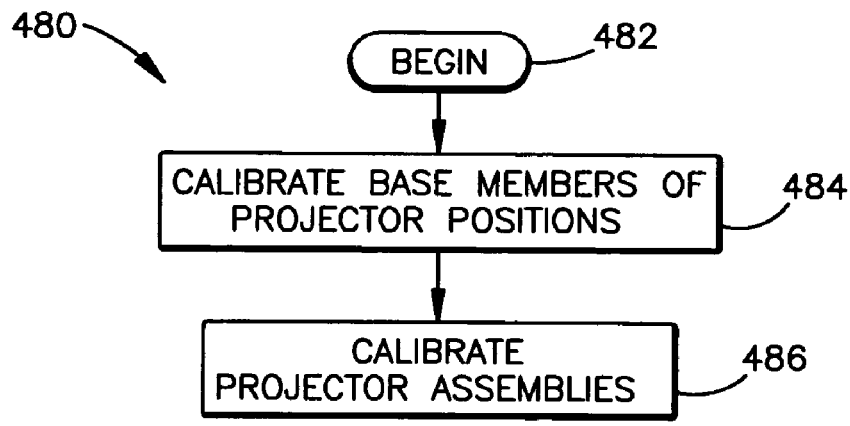
FIGS. 9-13 illustrate methodologies that can be implemented through the system of FIGS. 1-8.

In accordance with the invention, a methodology 480 for calibrating the system 10 is illustrated in FIG. 9. Referring to the methodology 620 of FIG. 9 with reference to FIGS. 1-8, the methodology begins at 482, and proceeds to 484, where the alignment plate 200, calibrated as described above, is used to calibrate the base members 110 of the projector positions 52 in the projector array 14. This is done by aligning the lasers 210, 212, and 250 with corresponding locations on the component images 26 on the projection surface 24. At step 486, the alignment fixture 300, calibrated with the alignment plate 200 as described above, is used to calibrate the individual projector assemblies 180, including their foot members 150, such that the projector projects a reference image that aligns with the image area on the screen 310.

Figure 10:
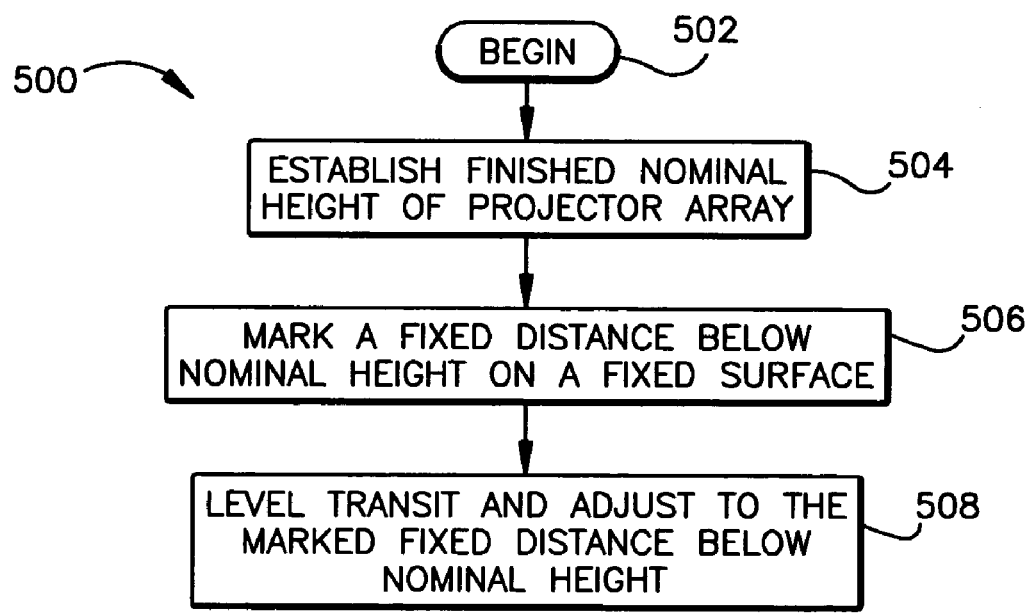
Figure 11:
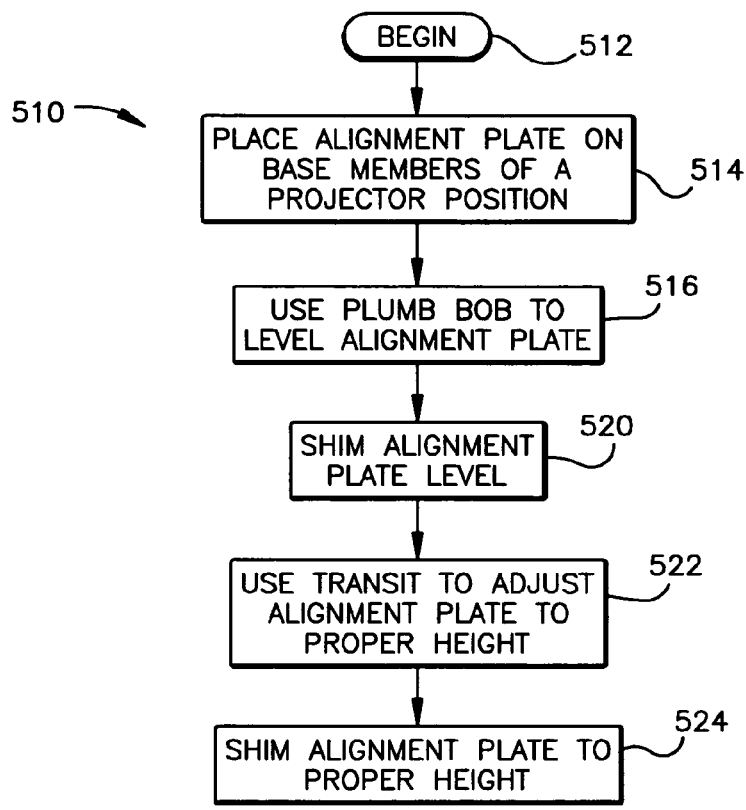
Figure 12:
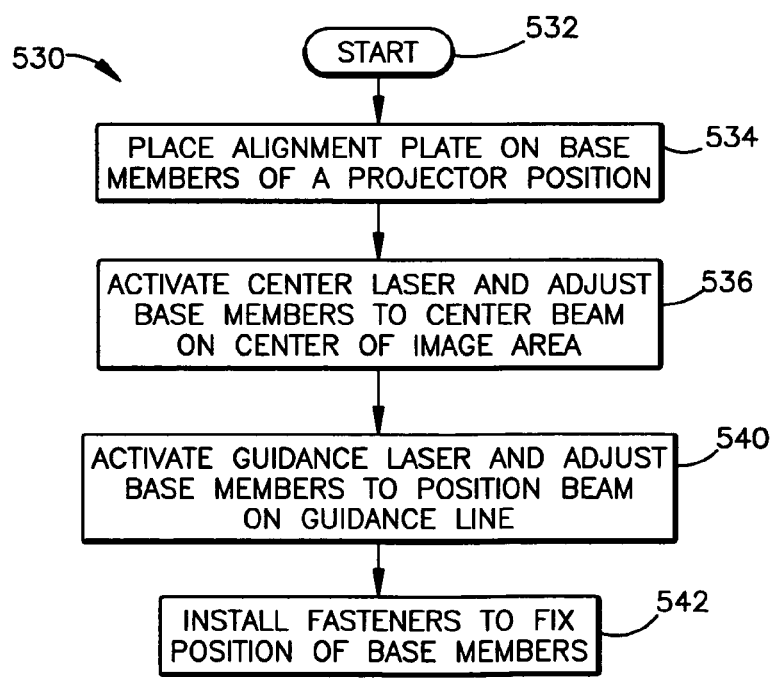

Methodologies for adjusting the position of the base members 110 of a projector position 52 in the projector array 14 relative to its corresponding component image 26 on the projection surface 24 are illustrated in FIGS. 10-12. Referring to the methodology 500 of FIG. 10 with reference to FIGS. 1-6, the methodology begins at 502, and proceeds to 504, where a finished nominal height of the projector array 14 above the projection surface 24 is established. For reference purposes, this nominal height may, for example, be the height of the bottom surface 222 of the alignment plate 200 above the projection surface 24. For purposes of example, assume this finished height is ten feet. At 506, a mark is placed on a permanent surface (e.g. a structural wall) a fixed distance, e.g., 10 inches, below the nominal height of the Alignment Plate bottom surface. At 508, the construction transit is mounted on a tripod, leveled, and its height adjusted so that the mark established at 506 described is centered in the crosshairs of the transit.

These steps being complete, the base members 110 for the projector position can be adjusted to be level and at the correct height in accordance with the methodology 510 of FIG. 11. Referring to the methodology 510 of FIG. 11 with reference to FIGS. 1-6, the methodology begins at 512, and proceeds to 514, where the alignment plate 200 is placed on the base members 110 of a projector position 52 in the projector array 14. The optical plumb bob is placed on the floor/projection surface 24 beneath the mirror 220 on the alignment plate 200. At 516, the plumb bob laser beam is observed as it reflects from the mirror 220 and returns to the exit window of the plumb bob. When the returning beam coincides with the exit beam, the alignment plate 200 is level. At 520, the base members 110 are shimmed using the washers 132 to level the alignment plate 200.

At 522, with the alignment plate 200 level, the scale 224 is observed through the transit telescope. The distance observed on the scale 224 of the transit is used to determine the distance that the base members 110 need to be adjusted vertically upward in order to place the alignment plate 200 at the correct height above the projection surface 24. At 524, all three base members 110 of the projector position are shimmed this distance via washers 132 in order to raise the height of the alignment plate 200 without affecting its level.

The base members 110, having been adjusted to level and the proper height, can be adjusted to the proper x-y axis position and to the proper rotation around the z-axis (yaw). Prior to doing so, the projection surface 24 is marked to indicate the centers 32 of the component images 26. The centers 32 are laid out with a predetermined degree of precision (e.g., within 1/64 inch or less) and marked, for example, using graphic-arts style registration marks. Guidance lines 34 connecting the image centers 32 may also be marked on the projection surface 24.

The x-y axis position and rotation around the z-axis of the base members 110 can be determined in accordance with the methodology 530 of FIG. 12. Referring to the methodology 530 of FIG. 12 with reference to FIGS. 1-6, the methodology begins at 532, and proceeds to 534, where the alignment plate 200 is placed on the base members 110 of the projector position 52. The cylindrical foot members 230 engaging the base members 110 will urge the base members to rotate or pivot to align their respective axes 116 toward a common center that coincides with the axis 240 of the alignment plate 200. At 536, the center laser 210 is activated and the base members 110 are adjusted in the x-y directions to position the beam of the center laser on the center mark 32. At 540, the guidance laser 214 is activated and the base members 110 are adjusted to position the beam of the guidance laser on the guidance line 34. When the beam of the center laser 210 hits the center mark 32 and the beam of the guidance laser 214 hits the guidance line 34, the base members 110 are positioned at the proper x-y position and z-axis rotation relative to the corresponding image center 32. At 542, the fasteners 130 are installed to secure the base members 110 in their respective calibrated positions.

At this point, calibration of the base members 110 is complete. The methodologies 510 and 530 of FIGS. 11 and 12 can now be repeated for each of the projector positions 52 in the projector array 14 to calibrate their base members 110. While doing so, projectors 12 or dummy weights can be used to maintain normal deflection in the support structure 20. Through this process, the base members 110 of each projector position 52 in the projector array 14 will be calibrated to the same position and orientation relative to the centers 32 of their respective component images 26.

In the methodologies 510 and 530 described above, the alignment plate 200 is fit with the cylindrical foot members 230. This may be advantageous in that the base members 110 are maintained oriented toward the center line 240. Since the base members 110 are adjusted in the same horizontal plane, the cylindrical foot members 230 seat completely in the V-grooves and the alignment plate 200 is thus positioned in the same position it would if the spherical foot members 150 had been installed for a true kinematic engagement. If, however, the base members 110 cannot be adjusted into a horizontal plane, it may be necessary to repeat the methodologies 510 and 530 with the spherical foot members 150 installed on the alignment plate 200. In this case, the cylindrical foot members 230 should be used initially to adjust and mark the base members 110 to align with the centerline 240.

Once the base members 110 of the projector positions 52 are calibrated to the desired position relative to the projection surface 22, the projector 12 of each projector assembly 180 can be calibrated to the desired position relative to its associated foot members 150. Adjustments of the projector 12 relative to its associated foot members 150 of a projector assembly 180 are achieved through use of the alignment fixture 300 described above. Throughout this methodology, the alignment fixture 300 is maintained in the same configuration established using the alignment plate 200.

Figure 13:
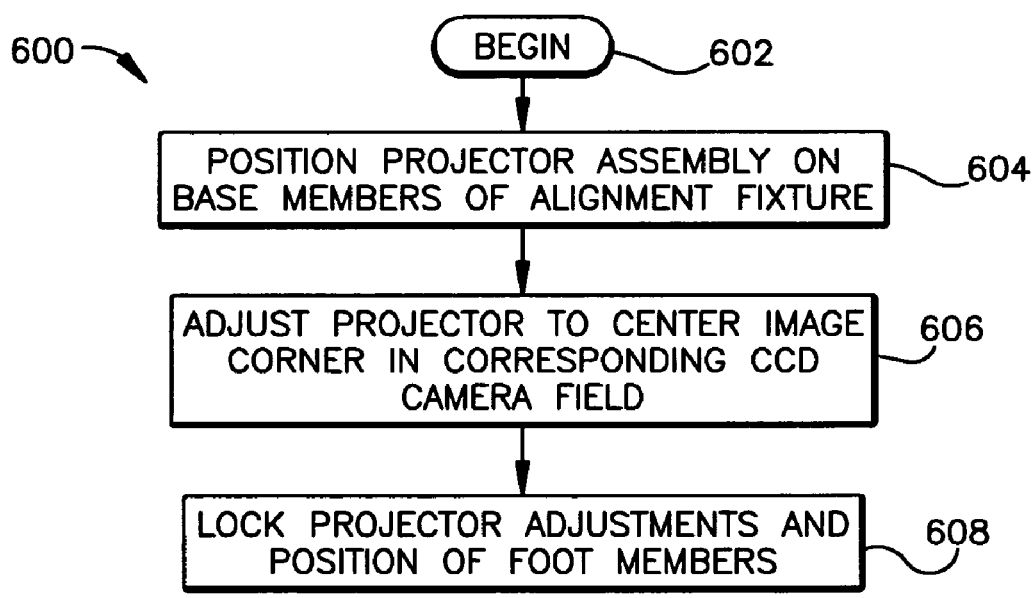

A methodology 600 for calibrating a projector assembly 180 is illustrated in FIG. 13. Referring to the methodology 600 of FIG. 13 with reference to FIG. 8, the methodology begins at 602, and proceeds to 604, where a projector assembly 180 is positioned with its foot members 150 on corresponding base members 110 of the alignment fixture 300. At 602, a signal source is connected to the projector 12 on the alignment fixture 300. The signal source generates a reference rectangle sized to coincide with the dimensions of the corresponding component image 26 on the projection surface 24.

At 606, the projector is adjusted such that, each CCD camera 312 at the corners of the image area on the screen 310, each see their respective corners of the reference rectangle at the exact center of the camera field. These adjustments are also made such that the CCD camera 312, at the center of the image area on the screen 310, see the center of the reference rectangle at the exact center of the camera field. The adjustments to the projector 12 performed at 606 may entail a variety of different adjustments in order to achieve a variety of results. Among these adjustments, the mirror in the projector 12 may be adjusted, the zoom of the projector 12 may be adjusted, and the x-y lens position of the projector may be adjusted. For example, the size of the rectangle can be adjusted by the zoom of the projector, the X keystone can be adjusted by adjusting the x-tilt of the projector mirror, the image rotation can be adjusted by the y-tilt of the projector mirror, and the x-y centering can be adjusted by the projector lens shift. Y-tilt of the mirror also affects Y keystone. If Y keystone remains after the image rotation, then it may be necessary to "roll" the projector 12 by shimming at the interface of projector 12 and support plate 88. Adjustments may also be made by shimming or otherwise adjusting the foot members 150. At step 608, the projector adjustments are secured and the foot members 150 are secured in the proper position via the fasteners 164.

At this point, calibration of the projector assembly 180 is complete. The methodology 600 of FIG. 13 can now be repeated for each of the projector positions 52 in the projector array 14. As a result, the foot members 150 for each projector assembly 180 in the system 10 are calibrated to the same position relative to their respective projectors 12. This, combined with the fact that the base members 110 are calibrated to the same position relative to their corresponding component images 26, results in the projector assemblies 180 being capable of being placed at any position 52 in the projector array 14 without adjustment. Other replacement or spare projector assemblies may also be calibrated as described above so as to provide spare projector assemblies that can replace a projector assembly at any position 52 in the array 14 without adjustment.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, the support plate could be omitted from the projector assembly and the foot members could be connected directly to the projector. This example would require that the configuration of the base members at the projector positions, the alignment plate, and the alignment fixture projector positions be adjusted to accommodate the configuration (e.g., the footprint) of the projector. The present invention is intended to embrace these and all other such alterations, modifications and variations that fall within the spirit and scope of the appended claims.

What is claimed is:

1. A system for supporting a projector on a support structure relative to a projection surface, the system comprising:
a plurality of base members connectable with the support structure and having a position adjustable relative to the projection surface;
a base member calibration system for calibrating the base members to a predetermined position relative to the projection surface;
a plurality of foot members for supporting the projector, each foot member having a position adjustable relative to the projector; and
a projector calibration system for calibrating the projector to a predetermined position relative to the foot members; the projector calibrated to the predetermined position relative to the foot members being calibrated to the predetermined position relative to the projection surface when the foot members rest on the base members.

2. The system recited in claim 1, wherein the projector and base members when calibrated position the projector at a predetermined position relative to the projection surface.

3. The system recited in claim 1, wherein each of the base members comprises a body portion including an elongated notch with opposing side walls that extend parallel to an axis of the base member and at acute angles relative to each other.

4. The system recited in claim 3, wherein each of the foot members comprises a body portion having a spherical surface for being received in the notch of a base member, the spherical surface engaging the opposing side walls of the notch.

5. The system recited in claim 4, wherein the base members include three base members that are connected with the support structure and the foot members include three foot members that are connected with the projector, each of the three base members being adapted to receive a corresponding one of the three foot members to position the projector at a predetermined position relative to the projection surface.

6. The system recited in claim 4, wherein the base members when calibrated to the predetermined position relative to the projection surface have their respective axes directed toward a common location.

7. The system recited in claim 1, wherein the base member calibration system comprises an alignment plate, the alignment plate including center beam projector for projecting a center beam onto a center of a component image area on the projection surface, and a corner beam projector for projecting a corner beam onto respective corners of the component image area on the projection surface.

8. The system recited in claim 7, wherein the center beam projector and corner beam projector comprise lasers.

9. The system recited in claim 1, wherein the projector calibration system comprises an alignment fixture adapted to receive the foot members to support the projector, the alignment fixture including a screen onto which the projector can project a reference image, the alignment fixture including a monitoring system for monitoring the reference image on the screen while the positions of the foot members are adjusted to determine when the projector is adjusted to the predetermined position relative to the foot members.

10. The system recited in claim 9, wherein the monitoring system comprises at least one CCD camera.

11. The system recited in claim 1, wherein any projector adjusted to the predetermined position relative to associated foot members and supported on the support structure by base members adjusted to the predetermined position relative to the projection surface is adapted to project an image to a predetermined position on the projection surface.

12. A system for projecting a tiled composite image on a projection surface from a support structure positioned relative to the projection surface, the composite image being composed of an array of component images, the system comprising:
a plurality of projector positions arranged on the support structure, each projector position being associated with a component image area on the projection surface and including adjustable base members adjusted to predetermined positions relative to the projection surface;
a plurality of projector assemblies each comprising a projector and foot members, each projector being adjusted to a predetermined position relative to the foot members of the associated projector assembly;
a base member calibration system for calibrating the base members of each projector position to the predetermined positions relative to the component image area of the projector position; and
a projector calibration system for calibrating the projector of each projector assembly to the predetermined position relative to the foot members of the projector assembly;
the foot members of any of the plurality of projector assemblies being receivable in the base members of any of the plurality of projector positions to thereby support the associated projector at a predetermined position relative to the component image area of the projector position.

13. The system recited in claim 12, wherein foot members of any calibrated projector assembly is receivable in calibrated base members of any of the plurality of projector positions to thereby support the associated projector at a predetermined position relative to the component image area of the projector position.

14. The system recited in claim 13, wherein any calibrated projector assembly having foot members received in calibrated base members of any of the plurality of projector positions is adapted to project a component image to a predetermined position on the projection surface.

15. The system recited in claim 14, wherein the component image projected to a predetermined position on the projection surface is aligned with adjacent component images on the projection surface.

16. The system recited in claim 13, wherein any calibrated projector assembly having foot members received in calibrated base members of any of the projector positions is adapted to project a component image to a predetermined position on the component image area of the projector position.

17. The system recited in claim 13, wherein the base member calibration system comprises an alignment plate, the alignment plate including a center beam projector for projecting a center beam onto a center of an image area on the projection surface, and a corner beam projector for projecting a corner beam onto respective corners of the image area on the projection surface.

18. The system recited in claim 13, wherein the projector calibration system comprises an alignment fixture adapted to receive the foot members to support the projector thereon, the alignment fixture including a screen onto which the projector may project a reference image and a monitoring system for monitoring the reference image on the screen while the position of the projector relative to the foot members is adjusted to determine when the projector is adjusted to the predetermined position relative to the foot members.

19. The system recited in claim 12, wherein each projector position includes three base members and each projector assembly includes three foot members, the three base members at each projector position being adapted to receive the three foot members of any of the projector assemblies.

20. The system recited in claim 12, wherein the base members when adjusted to the predetermined position relative to the projection surface have their respective axes directed toward a common location.

21. A system for supporting a projector on a support structure relative to a projection surface, the system comprising:
projector support means for supporting the projector, the projector support means having a position adjustable relative to the projector;
means for calibrating the projector to a predetermined position relative to the support means;
receiving means for receiving the projector support means, said receiving means being connectable with the support structure and having a position adjustable relative to the projection surface; and
means for calibrating the receiving means to a predetermined position relative to the projection surface;
the receiving means calibrated to the predetermined position relative to the projection surface being adapted to receive the projector support means of a projector calibrated to the predetermined position relative to the projector support means and position the projector at a predetermined position relative to the projection surface.

22. A method for aligning a projector with a projection surface, the projector having associated foot members receivable in base members connected with a support structure to support the projector on the support structure relative to a projection surface, the method comprising:
receiving the foot members in the base members;
calibrating the base members to a predetermined position relative to the projection surface; and
calibrating the projectors to a predetermined position relative to the foot members.

23. The method recited in claim 22, wherein the step of calibrating the base members comprises the steps of:
supporting an alignment plate on the base members; and
adjusting the position of the base members such that beams projected from the alignment plate strike the projection surface at predetermined locations.

24. The method recited in claim 23, further comprising the step of calibrating the alignment plate using an alignment fixture such that the beams projected from the alignment plate strike a screen of the alignment fixture at predetermined locations on the screen.

25. The method recited in claim 23, wherein the step of adjusting the position of the base members comprises the steps of:
shimming the alignment plate to level with respect to plumb;
shimming the alignment plate to a predetermined vertical height above the projection surface;
adjusting the position of the alignment plate such that a center beam projected from the alignment plate strikes a center of a component image area on the projection surface while a guidance beam projected from the alignment plate strikes a guidance line on the component image area.

26. The method recited in claim 22, wherein the step of calibrating the base members comprises the step of adjusting the base members such that axes of the respective base members are directed toward a common central axis.

27. The method recited in claim 22, wherein the step of calibrating the projector comprises the steps of:
  placing the foot members on an alignment fixture to support the projector on the alignment fixture;
  projecting a reference image from the projector; and
  adjusting at least one of the projector and the foot members such that the projector projects the reference image to a predetermined location on a screen.

28. The method recited in claim 27, wherein the step of adjusting at least one of the projector and the foot members comprises the steps of:
  aligning corners of the reference image at predetermined locations on the screen; and aligning a center of the reference image at a predetermined location on the screen.

* * * * *